(12) United States Patent
Ozaki

(10) Patent No.: US 8,967,601 B2
(45) Date of Patent: Mar. 3, 2015

(54) DAMPER

(75) Inventor: Kohsuke Ozaki, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 14/130,411

(22) PCT Filed: Jun. 29, 2012

(86) PCT No.: PCT/JP2012/066718
§ 371 (c)(1),
(2), (4) Date: Dec. 31, 2013

(87) PCT Pub. No.: WO2013/018479
PCT Pub. Date: Feb. 7, 2013

(65) Prior Publication Data
US 2014/0138198 A1 May 22, 2014

(30) Foreign Application Priority Data

Aug. 4, 2011 (JP) ................................. 2011-170587

(51) Int. Cl.
*B60G 11/56* (2006.01)
*F16F 9/56* (2006.01)
*F16F 9/54* (2006.01)

(52) U.S. Cl.
CPC .... *F16F 9/56* (2013.01); *F16F 9/54* (2013.01)
USPC ........................................... 267/221; 267/34

(58) Field of Classification Search
USPC .................. 188/300; 267/34, 64.12, 221; 248/354.1–354.5
See application file for complete search history.

(56) References Cited

U.S. PATENT DOCUMENTS

| 4,744,444 A * | 5/1988 | Gillingham .................... 188/315 |
| 2009/0050771 A1 * | 2/2009 | Horne et al. ................ 248/354.5 |

FOREIGN PATENT DOCUMENTS

| JP | S61-73941 U | 5/1986 |
| JP | S61-191540 U | 11/1986 |
| JP | S63-159307 U | 10/1988 |
| JP | H07-38776 U | 7/1995 |
| JP | H10-325442 A | 12/1998 |
| JP | 2002-293119 A | 10/2002 |
| JP | 2009-074647 A | 4/2009 |

* cited by examiner

*Primary Examiner* — Christopher Schwartz
(74) *Attorney, Agent, or Firm* — Rabin & Berdo, P.C.

(57) ABSTRACT

A damper includes a vehicle-body-side mounting portion, an axle-side mounting portion, and a vehicle height adjusting mechanism for adjusting a distance between the vehicle-body-side mounting portion and the axle-side mounting portion. The vehicle height adjusting mechanism includes a first tubular member formed into a bottomed tubular shape, a second tubular member formed into a bottomed tubular shape and inserted from the bottom side into the first tubular member, and a stopper member having a shaft portion and a locking portion provided at a proximal end of the shaft portion. A distal end of the shaft portion is fixed to the bottom of the first tubular member. The shaft portion is inserted through a hole formed in the bottom of the second tubular member. The locking portion abuts on the bottom of the second tubular member.

4 Claims, 5 Drawing Sheets

DAMPER

TECHNICAL FIELD

The present invention relates to an improvement of a damper.

BACKGROUND ART

As is well-known, in a vehicle, a suspension spring is interposed between a vehicle body and an axle so as to elastically support the vehicle body. With this configuration, even if wheels are vibrated due to roughness of a road surface during running of the vehicle, it is possible to prevent the vibration from being transmitted directly to the vehicle body.

Further, the vibration cannot be damped only with use of the suspension spring, and resonance may occur depending on a vibration frequency. Therefore, a damper is provided in parallel to the suspension spring.

Japanese Utility Model Application Laid-open No. 63-159307 and Japanese Utility Model Application Laid-open No. 07-038776 disclose, as a damper installed in a straddle-type vehicle such as a motorcycle, a damper with a vehicle height adjusting function, which is capable of adjusting a vehicle height in accordance with a physique of a user.

For example, as illustrated in FIGS. 4A and 4B, the damper with a vehicle height adjusting function includes a cylinder 4, a rod 5 inserted into the cylinder 4 so as to be capable of protruding from and retracting into the cylinder 4, a rod-side mounted member 1A fixed to an upper end of the rod 5 illustrated in FIG. 4A, and a cylinder-side mounted member 8 fixed to a lower end of the cylinder 4 illustrated in FIG. 4A.

A vehicle-body-side mounting portion C1 is formed in the rod-side mounted member 1A, and an axle-side mounting portion C2 is formed in the cylinder-side mounted member 8. The damper is interposed through the intermediation of the mounting portions C1, C2 between a frame on the vehicle body side and a swing arm on the axle side.

The damper further includes a vehicle height adjusting mechanism H1 capable of adjusting a distance X between the mounting portions C1, C2. The vehicle height adjusting mechanism H1 includes a holder 2A fixed to the upper end of the rod 5 illustrated in FIG. 4A, and a shaft portion 100 formed in the rod-side mounted member 1A and threadingly engaged with the holder 2A. The rod-side mounted member 1A is turned relative to the holder 2A to change an overlapping amount between the shaft portion 100 and the holder 2A. Thus, the vehicle height can be adjusted.

In other words, the overlapping amount between the shaft portion 100 and the holder 2A is increased, specifically, an axial length Y of a region in which the shaft portion 100 and the holder 2A overlap each other is increased, and thus the distance X between the mounting portions C1, C2 is correspondingly reduced. As a result, it is possible to lower the vehicle height.

On the other hand, the overlapping amount between the shaft portion 100 and the holder 2A is reduced, specifically, the axial length Y of the region in which the shaft portion 100 and the holder 2A overlap each other is reduced, and thus the distance X between the mounting portions C1, C2 is correspondingly increased. As a result, it is possible to raise the vehicle height.

SUMMARY OF INVENTION

In the conventional damper with a vehicle height adjusting function, the rod-side mounted member 1A is threadingly engaged only with the holder 2A. Accordingly, when the rod-side mounted member 1A is turned continuously so as to protrude from the holder 2A, the rod-side mounted member 1A is removed from the holder 2A.

Therefore, in an instruction manual and the like, a limit of adjustment by the vehicle height adjusting mechanism H1 in a case of raising the vehicle height needs to be described in order to urge a user to pay attention. When raising the vehicle height, a user has been required to adjust the vehicle height while being aware of the limit of adjustment.

In this context, as illustrated in FIG. 5, the following structure is conceivable. Specifically, a shaft portion 101 of a rod-side mounted member 1B is extended, and a locking portion 101a is provided at a distal end of the shaft portion 101. When adjustment reaches its limit, the locking portion 101a abuts on a holder 2B. With this structure, even if a user is not aware of the limit of adjustment when raising the vehicle height, it is possible to mechanically inform the user of the limit of adjustment.

However, in this structure, a region in which the shaft portion 101 and the holder 2B capable of adjusting the vehicle height overlap each other, and the locking portion 101a are arranged in a line (in series) in an axial direction. Thus, a vehicle height adjusting mechanism H2 has a long axial length.

It is an object of the present invention to provide a damper capable of mechanically informing a user of the limit of adjustment even if a user is not aware of the limit of adjustment when raising the vehicle height, and capable of forming a vehicle height adjusting mechanism into a compact configuration.

According to one aspect of the present invention, a damper comprises a vehicle-body-side mounting portion coupled on a vehicle body side; an axle-side mounting portion coupled on an axle side; and a vehicle height adjusting mechanism adapted to adjust a distance between the vehicle-body-side mounting portion and the axle-side mounting portion, wherein the vehicle height adjusting mechanism includes a first tubular member formed into a bottomed tubular shape so as to have a bottom and a tubular portion, a second tubular member being formed into a bottomed tubular shape so as to have a bottom and a tubular portion and being inserted from the bottom side into the first tubular member so as to be capable of protruding from and retracting into the first tubular member, and a stopper member having a shaft portion and a locking portion provided at a proximal end of the shaft portion, a distal end of the shaft portion is fixed to the bottom of the first tubular member, the shaft portion is movably inserted through a hole formed in the bottom of the second tubular member, and the locking portion abuts on the bottom of the second tubular member.

Embodiments of the present invention and advantages thereof are described in detail below with reference to the accompanying drawings.

DESCRIPTION OF EMBODIMENTS

In the following, a damper according to an embodiment of the present invention is described with reference to the drawings. The same reference symbols of the respective drawings denote the same or corresponding components.

Figure 1:
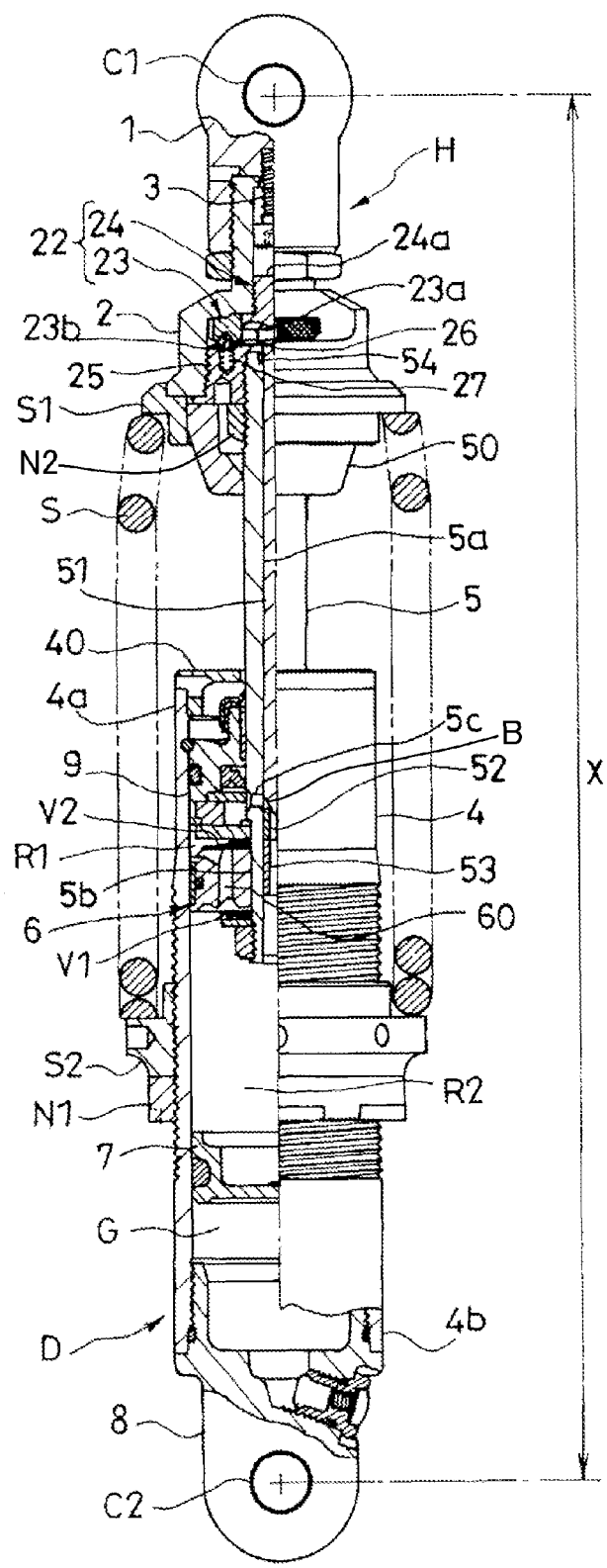
FIG. 1 is a partially cutout front view illustrating a use state of a damper according to an embodiment of the present invention.

As illustrated in FIG. 1, a damper D according to this embodiment includes a vehicle-body-side mounting portion C1 coupled on a vehicle body side, an axle-side mounting portion C2 coupled on an axle side, and a vehicle height adjusting mechanism H for adjusting a distance X between the vehicle-body-side mounting portion C1 and the axle-side mounting portion C2.

Figure 2:
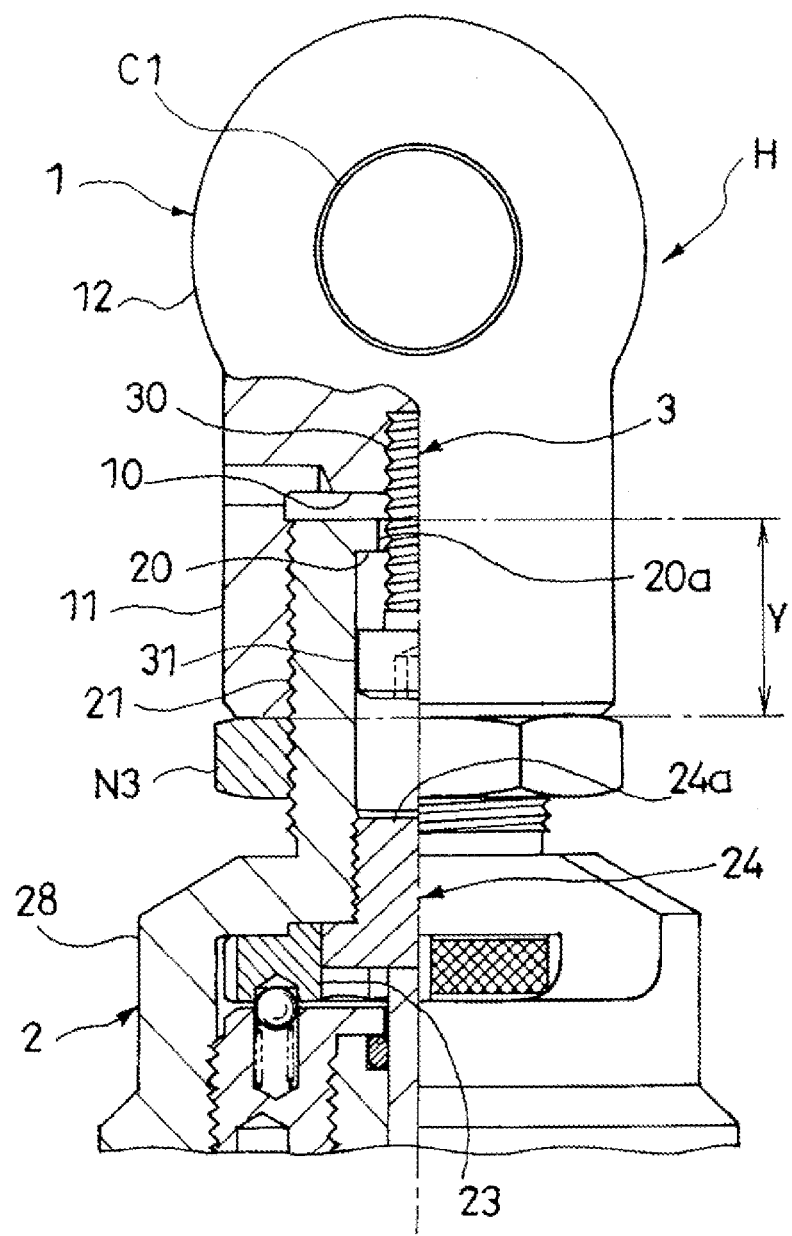
FIG. 2 is an enlarged and partially cutout front view illustrating a main part of the damper illustrated in FIG. 1.

As illustrated in FIG. 2, the vehicle height adjusting mechanism H includes a rod-side mounted member 1 serving as a first tubular member that is formed into a bottomed tubular shape so as to include a bottom 10 and a tubular portion 11, a holder 2 serving as a second tubular member that is formed into a bottomed tubular shape so as to include a bottom 20 and a tubular portion 21 and is inserted from the bottom 20 side into the rod-side mounted member 1 so as to be capable of protruding from and retracting into the rod-side mounted member 1, and a stopper member 3 including a shaft portion 30 and a locking portion 31 provided continuously with a proximal end (lower end illustrated in FIG. 2) of the shaft portion 30.

A distal end (upper end illustrated in FIG. 1) of the shaft portion 30 is fixed to the bottom 10 of the rod-side mounted member 1. The shaft portion 30 movably passes through a hole 20a formed in the bottom 20 of the holder 2, and the locking portion 31 can abut on the bottom 20 of the holder 2.

As illustrated in FIG. 1, the damper D is a single-cylinder-type damper including a cylinder 4, a rod 5 movably inserted into the cylinder 4, a piston 6 retained at a distal end (lower end illustrated in FIG. 1) of the rod 5 and partitioning an inside of the cylinder 4 into two chambers R1, R2 filled with a working fluid, and a free piston 7 for defining a gas chamber G charged with a gas in a bottom portion (lower portion illustrated in FIG. 1) of the cylinder 4.

On an outer side of the damper D, a suspension spring S for elastically supporting a vehicle body is provided. The suspension spring S is interposed between a rod-side spring bearing S1 fixed to an upper end of the rod 5 illustrated in FIG. 1 through the intermediation of the holder 2, and a cylinder-side spring bearing S2 fixed to an outer periphery of the cylinder 4.

The cylinder-side spring bearing S2 is threadingly engaged with the outer periphery of the cylinder 4. The cylinder-side spring bearing S2 is turned, and thus can be changed in its position in an up-and-down direction of FIG. 1. A lock nut N1 for the cylinder-side spring bearing S2 is threadingly engaged with the outer periphery of the cylinder 4. Thus, the cylinder-side spring bearing S2 has double nut structure, and thus is prevented from loosening.

The damper D further includes the rod-side mounted member 1 mounted on an upper side of the rod 5 illustrated in FIG. 1, and a cylinder-side mounted member 8 mounted on a lower side of the cylinder 4 illustrated in FIG. 1. The vehicle-body-side mounting portion C1 is formed in the rod-side mounted member 1, and the axle-side mounting portion C2 is formed in the cylinder-side mounted member 8. The damper D is coupled through the intermediation of the mounting portions C1, C2 to a frame provided on the vehicle body side and to a swing arm provided on the axle side.

The distance X between both the mounting portions C1, C2 can be changed by the vehicle height adjusting mechanism H described later, and the distance X can be set in accordance with a physique of a user. It should be noted that an interval between both the mounting portions C1, C2 is also changed depending on extension and contraction of the damper D. Herein, the distance X refers to the interval between both the mounting portions C1, C2 in a case where a position of the piston is the same.

The cylinder 4 is formed into a cylindrical shape, and upper and lower opening portions 4a, 4b of the cylinder 4 are closed by a head member 9 and the cylinder-side mounted member 8, respectively. Therefore, the working fluid and the gas contained in the cylinder 4 do not leak out to the outside.

It should be noted that, besides an oil, as the working fluid filled into the chambers R1, R2 of the cylinder 4, water, a gas, and the like may be used. An inert gas such as nitrogen is used as the gas charged into the gas chamber G, for example.

Above the head member 9, a bump stopper 40 is fitted into the upper opening portion 4a of the cylinder 4 illustrated in FIG. 1. On the other hand, a bump cushion 50 is fixed to the upper end of the rod 5. Therefore, when the damper D contracts completely, the bump cushion 50 abuts on the bump stopper 40, and thus absorbs a shock caused when the damper D contracts completely.

The piston 6 for partitioning the inside of the cylinder 4 into the chambers R1, R2 is slidably inserted into the cylinder 4. In the piston 6, an extension-side fluid passage 60 and a compression-side fluid passage (not shown) are formed. The extension-side fluid passage 60 only allows the working fluid to move from the chamber R1 on the rod side into the chamber R2 on the piston side. The compression-side fluid passage only allows the working fluid to move from the chamber R2 on the piston side into the chamber R1 on the rod side.

In addition, damping valves V1, V2 serving as a damping force generating mechanism are laminated on and under the piston 6 as illustrated in FIG. 1. The damping valves V1, V2 include the extension-side damping valve V1 laminated under the piston 6 as illustrated in FIG. 1, and the compression-side damping valve V2 laminated on the piston 6 as illustrated in FIG. 1.

The extension-side damping valve V1 is moved onto and away from a valve seat (not denoted by reference symbol) formed on a lower surface of the piston 6 illustrated in FIG. 1, and thus openably closes an outlet of the extension-side fluid passage 60. The extension-side damping valve V1 applies resistance to the working fluid flowing through the extension-side fluid passage 60.

On the other hand, the compression-side damping valve V2 is moved onto and away from a valve seat (not shown) formed on an upper surface of the piston 6 illustrated in FIG. 1, and thus openably closes an outlet of the compression-side fluid passage (not shown). The compression-side damping valve V2 applies resistance to the working fluid flowing through the compression-side fluid passage.

Therefore, when the damper D extends and contracts while the rod 5 moves in the cylinder 4 in the up-and-down direction of FIG. 1, the damper D generates a damping force caused by fluid passage resistance applied when the working fluid flows through the fluid passages (extension-side fluid passage 60 and compression-side fluid passage (not shown)).

Further, the free piston 7, which defines the gas chamber G in the bottom portion (lower portion illustrated in FIG. 1) of the cylinder 4, moves in the up-and-down direction of FIG. 1 along with protrusion and retraction of the rod 5, and thus expands and narrows the gas chamber G. This compensates a change in volume of the inside of the cylinder corresponding to a volume of the rod that protrudes from and retracts into the cylinder 4.

The rod 5, which protrudes from and retracts into the cylinder 4, is formed into a tubular shape so as to include an axial center hole 5a passing through an axial center portion thereof. The rod 5 retains the piston 6 on an outer periphery of a distal end portion 5b (lower end portion illustrated in FIG. 1) thereof.

Into the axial center hole 5a, a control rod 51 having a conical distal end (lower end illustrated in FIG. 1) is inserted from a proximal end side (upper side illustrated in FIG. 1) of the rod 5 so as to be movable in an axial direction. In addition, a bush 52 opposing the distal end of the control rod 51, and a holding member 53 holding down the bush 52 are retained on an inner periphery of the distal end portion 5b of the rod 5.

The bush 52 and the holding member 53 are each formed into a tubular shape, and hence the axial center hole 5a is communicated to the chamber R2 on the piston side. However, an upper side of the axial center hole 5a illustrated in FIG. 1 is sealed by a seal 54 interposed between an inner peripheral surface of the rod 5 and an outer peripheral surface of the control rod 51.

In addition, in a portion of the rod 5 that is directly above the distal end portion 5b for retaining the piston 6 as illustrated in FIG. 1, a communication hole 5c is formed. The communication hole 5c extends through a thickness of the rod 5, and communicates between the axial center hole 5a and the chamber R1 on the rod side. Therefore, the two chambers R1, R2 are communicated to each other through the communication hole 5c and the axial center hole 5a, but an upper opening of the axial center hole 5a illustrated in FIG. 1 is sealed by the seal 54. Accordingly, the working fluid does not leak through the axial center hole 5a out of the damper D. Specifically, the communication hole 5c and the axial center hole 5a form a bypass passage B for causing the working fluid to bypass the fluid passages (extension-side fluid passage 60 and compression-side fluid passage (not shown)).

An opening amount of the bypass passage B can be adjusted by an adjuster 22 that is turnably retained by the holder 2 at the upper end of the rod 5 illustrated in FIG. 1. The adjuster 22 includes an adjuster case 23 formed into an annular shape, and an adjuster body 24 inserted through a center hole 23a of the adjuster case 23.

The adjuster body 24 cannot be turned relative to the adjuster case 23, but is movable relative to the adjuster case 23 in the axial direction (up-and-down direction of FIG. 1). A protruding end portion 24a protruding from the adjuster case 23 to the upper side of FIG. 1 is threadingly engaged with the inner periphery of the holder 2.

On the other hand, the adjuster case 23 is turnably laminated on an annular receiving member 25 that is threadingly engaged with the upper end portion of the rod 5 illustrated in FIG. 1. In addition, a lock nut N2 is threadingly engaged with the upper end portion of the rod 5 illustrated in FIG. 1 as well as the receiving member 25. This double nut structure prevents looseness.

In a lower surface of the adjuster case 23 illustrated in FIG. 1, which opposes the receiving member 25, a plurality of detent grooves 23b are formed. A detent ball 26 is pressed to the detent grooves 23b by a spring 27. In this manner, a well-known detent mechanism is formed.

The detent mechanism is provided, and hence, when the adjuster case 23 is turned against a biasing force of the spring 27, the adjuster body 24 is turned together with the adjuster case 23. The adjuster body 24 moves in the axial direction depending on the turning direction, to thereby drive the control rod 51 in the axial direction. In this manner, the opening amount of the bypass passage B is changed, and a flow rate of the working fluid flowing through the fluid passages (extension-side fluid passage 60 and compression-side fluid passage (not shown)) is changed. Thus, the damping force can be adjusted.

Here, the vehicle height adjusting mechanism H capable of adjusting the distance X between the vehicle-body-side mounting portion C1 and the axle-side mounting portion C2 includes the rod-side mounted member 1 and the holder 2. The first tubular member corresponds to the rod-side mounted member 1, and the second tubular member corresponds to the holder 2.

As illustrated in FIG. 2, the rod-side mounted member 1 serving as the first tubular member includes the bottom 10, the tubular portion 11 extending from the outer periphery of the bottom 10 to the lower side of FIG. 2, and a rod-side mounted member body 12 continuously provided on the upper side of the bottom 10 illustrated in FIG. 2 and including the mounting portion C1 formed at a center thereof.

On the other hand, the holder 2 serving as the second tubular member includes the bottom 20, the tubular portion 21 extending from the outer periphery of the bottom 20 to the lower side of FIG. 2, and a holder body 28 continuously provided at the distal end (lower end illustrated in FIG. 2) of the tubular portion 21 and holding the adjuster case 23 therein.

The protruding end portion 24a of the adjuster body 24 is threadingly engaged with the inner periphery of the distal end portion (lower end portion illustrated in FIG. 2) of the tubular portion 21 of the holder 2. Further, a lock nut N3 and the tubular portion 11 of the rod-side mounted member 1 are threadingly engaged with the outer periphery of the tubular portion 21 of the holder 2. This double nut structure prevents looseness.

The vehicle height adjusting mechanism H further includes the stopper member 3 including the shaft portion 30, and the locking portion 31 provided continuously with the proximal end (lower end side illustrated in FIG. 2) of the shaft portion 30. It should be noted that the shaft portion 30 and the locking portion 31 are formed integrally with each other, and the stopper member 3 is formed into a bolt-like shape.

The distal end (upper end illustrated in FIG. 1) of the shaft portion 30 of the stopper member 3 is threadingly engaged with the bottom 10 of the rod-side mounted member 1, and is bonded to the bottom 10 with an adhesive. In addition, the shaft portion 30 is movably inserted through the hole 20a formed in the bottom 20 of the holder 2.

The locking portion 31 of the stopper member 3 is set to have such a size as to be prevented from slipping off from the hole 20a, and to be movable in the tubular portion 21 of the holder 2.

Next, operations and effects of the damper D according to this embodiment are described.

According to this embodiment, in a case of adjusting the vehicle height, the lock nut N3 is loosened, and the rod-side mounted member 1 is turned. Depending on the turning direction at this time, an overlapping amount between the rod-side mounted member 1 and the holder 2 can be increased and reduced.

Figure 3:
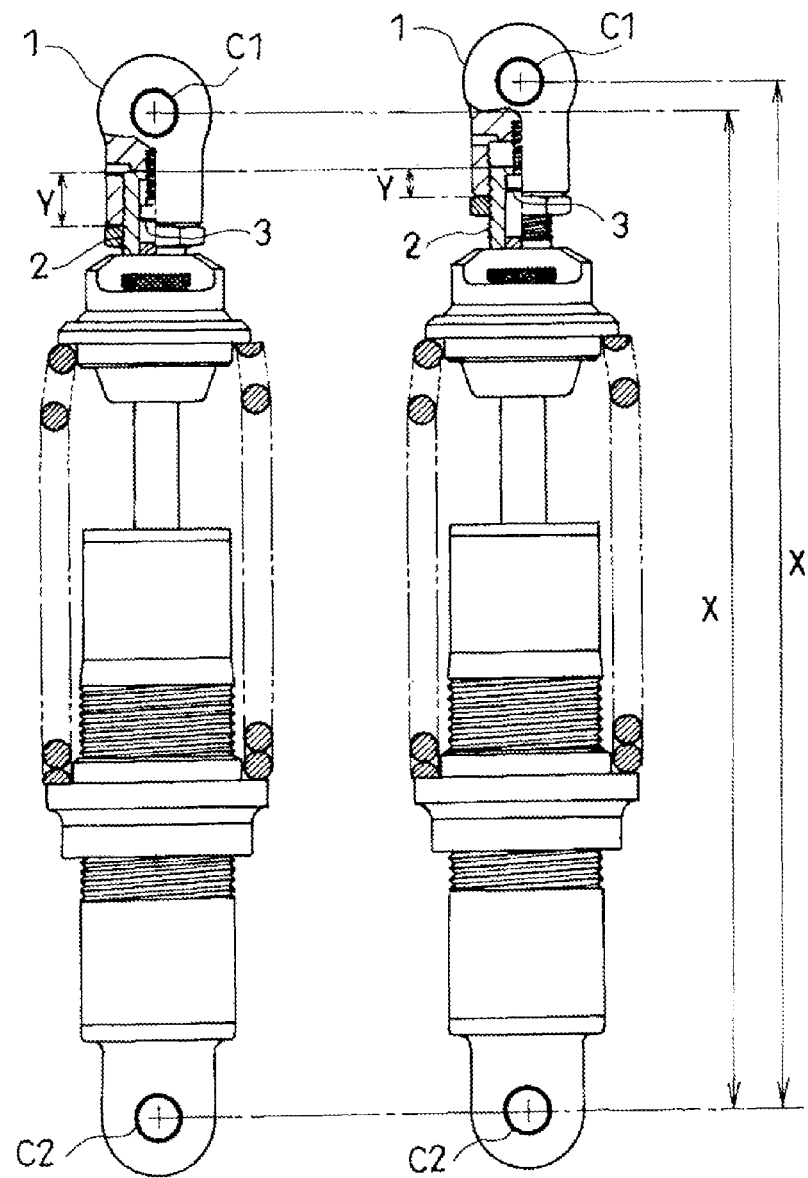
FIG. 3 is a partially cutout front view illustrating the use state of the damper according to the embodiment of the present invention, and illustrating a comparison between the damper in a state in which a distance between both mounting portions is reduced to lower a vehicle height, and the damper in a state in which the distance between both the mounting portions is increased to raise the vehicle height.
Figure 4A:
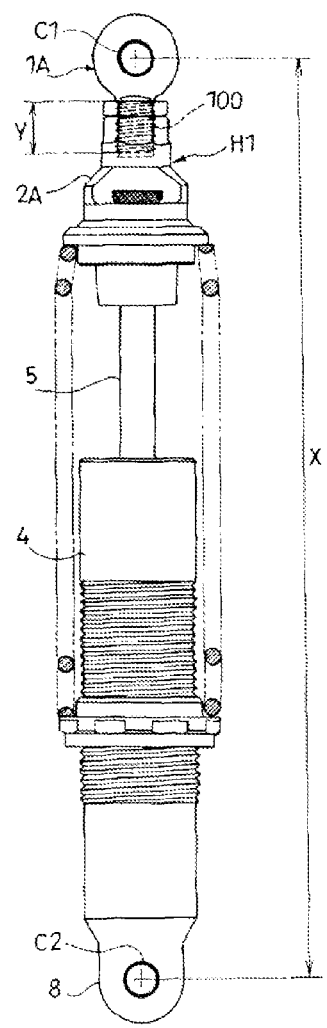
FIG. 4A is a front view illustrating a use state of a damper according to a comparative example.
Figure 4B:
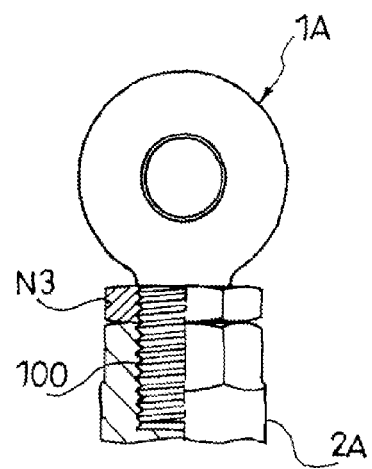
FIG. 4B is an enlarged and partially cutout front view illustrating a main part of the damper illustrated in FIG. 4A.
Figure 5:
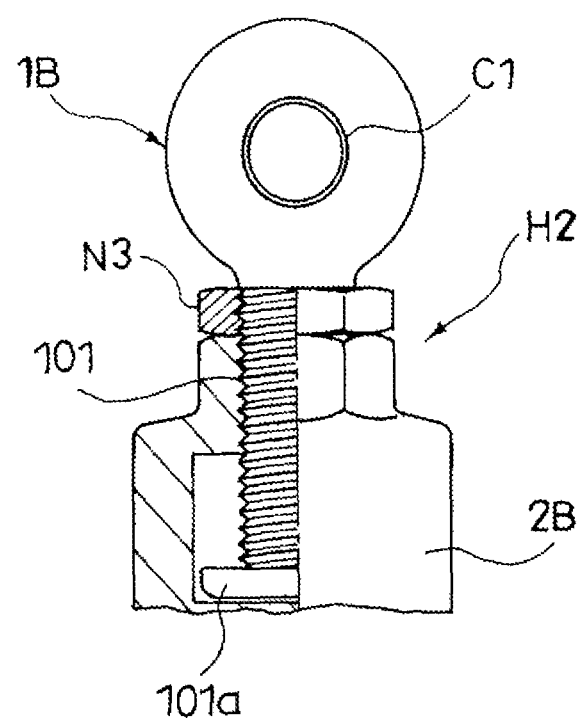
FIG. 5 is an enlarged and partially cutout front view illustrating a main part of a damper with a stopper function according to another comparative example.

As illustrated on the left side of FIG. 3, the overlapping amount between the rod-side mounted member 1 and the holder 2 is increased, specifically, an axial length Y of a region in which both the tubular portions 11, 21 overlap each other is increased, and thus the distance X between both the mounting portions C1, C2 is reduced. As a result, it is possible to lower the vehicle height.

On the other hand, as illustrated on the right side of FIG. 3, the overlapping amount between the rod-side mounted member 1 and the holder 2 is reduced, specifically, the axial length Y of the region in which both the tubular portions 11, 21 overlap each other is reduced, and thus the distance X between both the mounting portions C1, C2 is correspondingly increased. As a result, it is possible to raise the vehicle height.

In other words, within a range between a state illustrated on the left side of FIG. 3, in which the bottom 20 of the holder 2 abuts on the bottom 10 of the rod-side mounted member 1, and a state illustrated on the right side of FIG. 3, in which the locking portion 31 of the stopper member 3 abuts on the bottom 20 of the holder 2, the vehicle height can be adjusted.

Further, the stopper member 3 is provided, and hence, at the time of a limit of adjustment, as illustrated on the right side of FIG. 3, the locking portion 31 of the stopper member 3 abuts on the bottom 20 of the holder 2. Therefore, without being aware of the limit of adjustment when raising the vehicle height, a user can recognize the limit of adjustment.

Still further, the locking portion 31 functioning as the stopper member 3 moves in the tubular portion 21 of the holder 2, and is arranged in parallel to (inside) the region in which the tubular portion 11 of the rod-side mounted member 1 and the tubular portion 21 of the holder 2 overlap each other. Accordingly, the vehicle height adjusting mechanism H can be formed into a compact configuration.

Still further, in the damper D according to this embodiment, the adjuster 22 for adjusting the damping force, and the vehicle height adjusting mechanism H are provided on the rod side. Accordingly, the vehicle height adjusting mechanism H is formed into a compact configuration, and thus it is possible to secure a space for mounting the adjuster 22.

Still further, the tubular portion 11 of the rod-side mounted member 1 and the lock nut N3 are threadingly engaged with the outer periphery of the tubular portion 21 of the holder 2, and this double nut structure can prevent looseness. Accordingly, it is possible to easily and reliably position the rod-side mounted member 1 with respect to the holder 2.

Still further, the distal end of the shaft portion 30 of the stopper member 3 is threadingly engaged with the bottom 10 of the rod-side mounted member 1, and is bonded and fixed to the bottom 10 with an adhesive. Accordingly, it is possible to prevent the stopper member 3 from falling off due to vibration or the like that is input to the damper D.

The embodiments of the present invention described above are merely illustration of some application examples of the present invention and not of the nature to limit the technical scope of the present invention to the specific constructions of the above embodiments.

For example, according to the above-mentioned embodiment, the vehicle height adjusting mechanism H is formed by the rod-side mounted member 1 and the holder 2. However, in a case where the adjuster 22 for adjusting the damping force is not provided, the bottom 20 and the tubular portion 21 may be formed at the upper end portion of the rod 5 illustrated in FIG. 1, and the rod 5 may be used as the second tubular member.

Further, the vehicle height adjusting mechanism H may be structured to include the cylinder-side mounted member 8 and the cylinder 4.

Still further, according to the above-mentioned embodiment, the rod 5 is arranged on the vehicle body side, and the cylinder 4 is arranged on the axle side. However, the cylinder 4 may be arranged on the vehicle body side, and the rod 5 may be arranged on the axle side.

Still further, the above-mentioned embodiment exemplifies the single-cylinder-type damper as the damper D, but the following double-cylinder-type damper may be used. Specifically, in the double-cylinder-type damper, an outer cylinder forming a reservoir chamber is provided on the outer side of the cylinder 4, and the reservoir chamber compensates the change in volume of the inside of the cylinder corresponding to the volume of the rod that protrudes from and retracts into the cylinder.

Still further, according to the above-mentioned embodiment, the distal end of the shaft portion 30 of the stopper member 3 is threadingly engaged with the bottom 10 of the rod-side mounted member 1, and is bonded to the bottom 10 with an adhesive. However, the stopper member 3 may be prevented from slipping off using a pin which passes through the rod-side mounted member 1 and the distal end of the shaft portion 30.

The present application claims a priority based on Japanese Patent Application No. 2011-170587 filed with the Japan Patent Office on Aug. 4, 2011, all the contents of which are hereby incorporated by reference.

The invention claimed is:

1. A damper, comprising:
   a vehicle-body-side mounting portion coupled on a vehicle body side;
   an axle-side mounting portion coupled on an axle side; and
   a vehicle height adjusting mechanism adapted to adjust a distance between the vehicle-body-side mounting portion and the axle-side mounting portion, wherein
   the vehicle height adjusting mechanism includes a first tubular member formed into a bottomed tubular shape so as to have a bottom and a tubular portion, a second tubular member being formed into a bottomed tubular shape so as to have a bottom and a tubular portion and being inserted from the bottom side into the first tubular member so as to be capable of protruding from and retracting into the first tubular member, and a stopper member having a shaft portion and a locking portion provided at a proximal end of the shaft portion,
   a distal end of the shaft portion is fixed to the bottom of the first tubular member,
   the shaft portion is movably inserted through a hole formed in the bottom of the second tubular member, and
   the locking portion abuts on the bottom of the second tubular member.

2. The damper according to claim 1, wherein
   the tubular portion of the first tubular member and a lock nut are threadingly engaged with an outer periphery of the second tubular member, and the first tubular member is prevented from loosening by the lock nut.

3. The damper according to claim 1, wherein
   the distal end of the shaft portion of the stopper member is threadingly engaged with the bottom of the first tubular member, and is bonded and fixed to the bottom of the first tubular member with an adhesive.

4. The damper according to claim 1, further comprising:
   a cylinder;
   a rod movably inserted into the cylinder;

a mounted member fixed to the rod on a side opposite to the cylinder and comprising the vehicle-body-side mounting portion or the axle-side mounting portion;
a piston retained on the rod and partitioning an inside of the cylinder into two chambers filled with a working fluid;
a fluid passage communicating between the two chambers;
a damping force generating mechanism adapted to apply resistance to the working fluid flowing through the fluid passage;
a bypass passage bypassing the fluid passage and communicating between the two chambers;
a control rod adjusting an opening amount of the bypass passage;
an adjuster mounted to an end portion of the rod on the side opposite to the cylinder and driving the control rod; and
a holder holding the adjuster, wherein
the mounted member is the first tubular member, and the holder is the second tubular member.

* * * * *